(12) United States Patent
Mora

(10) Patent No.: US 10,820,536 B2
(45) Date of Patent: Nov. 3, 2020

(54) AUTONOMOUS PROGRAMMABLE PLANT WATERING DEVICE

(71) Applicant: Camilo Mora, Honolulu, HI (US)

(72) Inventor: Camilo Mora, Honolulu, HI (US)

( * ) Notice: Subject to any disclaimer, the term of this patent is extended or adjusted under 35 U.S.C. 154(b) by 462 days.

(21) Appl. No.: 15/428,699

(22) Filed: Feb. 9, 2017

(65) Prior Publication Data

US 2018/0220602 A1    Aug. 9, 2018

(51) Int. Cl.
*A01G 25/16* (2006.01)
*G05D 7/06* (2006.01)
*F16K 37/00* (2006.01)
*F16K 31/08* (2006.01)

(52) U.S. Cl.
CPC ......... *A01G 25/167* (2013.01); *A01G 25/165* (2013.01); *F16K 31/088* (2013.01); *F16K 37/0033* (2013.01); *G05D 7/0635* (2013.01)

(58) Field of Classification Search
CPC ............. F16K 31/0033; F16K 31/0631; F16K 31/0651; F16K 31/088; F16K 37/0033; A01G 25/167
See application file for complete search history.

(56) References Cited

U.S. PATENT DOCUMENTS

| | | | | |
|---|---|---|---|---|
| 2,366,412 A * | 1/1945 | Lambert | ............. | F16K 31/0631 137/625.65 |
| 3,552,437 A * | 1/1971 | Blosser, Jr. | ........... | F16K 11/056 137/625.4 |
| 3,981,446 A * | 9/1976 | Hunter | ................. | A01G 25/167 239/1 |
| 5,060,859 A * | 10/1991 | Bancroft | ............. | A01G 25/167 137/78.3 |
| 5,445,176 A * | 8/1995 | Goff | ...................... | A01G 25/167 137/78.3 |
| 6,085,772 A * | 7/2000 | McGill | ................. | F16K 17/366 137/39 |
| 10,125,892 B2 * | 11/2018 | Bentz | ..................... | F16K 31/082 |
| 2004/0256584 A1 * | 12/2004 | Zimmerling | ...... | A61M 5/16881 251/7 |
| 2005/0199842 A1 * | 9/2005 | Parsons | .................. | A01G 25/16 251/129.04 |

(Continued)

*Primary Examiner* — Christopher D Hutchens
(74) *Attorney, Agent, or Firm* — Francis Law Firm PLLC; James M. Francis

(57) ABSTRACT

A low power, autonomously programmable plant watering device for custom irrigation regimes of individual plants. The device has an integrated sensor that quantifies soil moisture. The device initiates watering by opening a magnetically sealed valve in response to a soil moisture measurement that falls below a preset threshold. The device can terminate watering by closing the magnetically sealed valve in response to a soil moisture measurement that meets or exceeds a preset threshold and/or at the expiration of a preset time interval. The device utilizes control system comprised of a microcontroller and an embedded application or applications to initiate moisture sensor readings and the opening and closing of the magnetically sealed valve. The valve is opened when the control system actuates a small motor that engages a Hall Effect sensor system with an articulated member having a reference magnet used as an open-closed valve status indicator and a strong magnet that is moved into a position to unseat a magnetically seated valve stop.

13 Claims, 4 Drawing Sheets

(56) References Cited

U.S. PATENT DOCUMENTS

| | | | | |
|---|---|---|---|---|
| 2007/0157512 | A1* | 7/2007 | Wein | A01G 25/167 47/48.5 |
| 2008/0224077 | A1* | 9/2008 | Neuhaus | F16K 25/00 251/129.01 |
| 2008/0251602 | A1* | 10/2008 | Leggett | A01G 25/167 239/69 |
| 2011/0284778 | A1* | 11/2011 | Neuhaus | F16K 31/0651 251/65 |
| 2017/0057805 | A1* | 3/2017 | Bischel | F16K 31/082 |
| 2017/0332566 | A1* | 11/2017 | Emory | F16K 31/001 |
| 2018/0328513 | A1* | 11/2018 | Emory | A01G 25/167 |

* cited by examiner

To Soil

AUTONOMOUS PROGRAMMABLE PLANT WATERING DEVICE

TECHNICAL FIELD

The apparatus of the present application relates generally to plant watering systems. More specifically, the apparatus of the present application relates to low power autonomous watering systems for plants.

BACKGROUND

A critical issue in the survival of plants is to ensure an adequate supply of water; both too little and too much water can kill a plant. Because of the importance of plants in providing food, carbon sequestration, oxygen production, home and urban decoration, etc., the field of plant watering devices is one of constant innovation, with several devices available commercially. The large number of available watering devices is in itself a reflection to the fact that such devices rarely fully satisfy all of the needs of the plant and its caretaker.

Available plant watering devices can be broadly grouped in two categories, i.e. passive and active watering control systems. Passive controls are based on the principle of osmosis. These types of devices use a membrane that when in contact with dry soil generates a vacuum force that pulls water from a reservoir watering the soil until it is moist at which point the osmosis force reduces, thus stopping water suction and the watering of the plant. These devices are simple and inexpensive, but they keep the plant constantly watered, which can be detrimental to plant health because the lack of a dry period favors the growth of bacteria and fungi and is an unnatural state for most plants. Moreover, these devices only water the soil that is in close proximity to the membrane, and as a result several devices and/or membranes are often needed to ensure that water is sufficiently distributed about most of the root system.

Active watering devices use soil moisture sensors, e.g. capacitive or resistive, in combination with a microprocessor to signal a need for watering or initiate the watering process in response to the measured soil moisture. Some of these devices are used only as soil moisture indicators, e.g. they activate an audible alarm, or otherwise communicate an analog or digital signal to indicate when soil moisture falls below a predetermined threshold value. These soil moisture indicator devices can be used to indicate the need for watering and, some can initiate a watering process when the soil moisture drops below a minimum soil moisture threshold value by opening a valve and/or actuation of a solenoid and/or turning on a water pump. Some devices activate irrigation networks for entire gardens and/or plantations and others are dedicated to individual plants. Active watering devices for individual plants provide very specialized care by monitoring the exact conditions in the close proximity of the plant, allow for a user-defined irrigation plan (e.g., accommodate wet-dry cycles tailored to the species) and do not require irrigation networks that can be prone to failure.

Active watering devices for plants can considerably improve the quality of life of the plant but they still have several limitations. First, they can be expensive due to the inclusion of hardware and software for communication, programming and processing of data and signals. Second, they are not necessarily autonomous requiring a portable device (mobile phone, table or computer) to be programmed and to display data, while demanding some effort from the user to install and learn the necessary software. Finally, active watering devices have relatively large power consumption making them unsuitable for long term use with batteries, and in outdoors conditions that lack access to electricity. Available technologies such as solenoids or water pumps constantly draw electrical current while watering and, adding the electrical requirements of the components used for communication and programming, results in high power consumption by the device, rendering it unsuitable for long term use with electric batteries as the power source. The limits imposed by high power consumption is one of the reasons why a large number of active water devices are only used as soil moisture indicators, or to control independent watering systems.

SUMMARY

The apparatus of the present application is a plant watering device for the care of individual plants that includes an autonomous interface that allows for programming of the device by the user without external hardware and software and includes a low power consumption valve system that allows for the long-term use of the device with small batteries. The autonomously programmable plant watering device possesses an integrated sensor that quantifies soil moisture. The device initiates watering by opening a magnetically sealed valve in response to a soil moisture measurement that falls below a preset threshold. The device can terminate watering by closing the magnetically sealed valve in response to a soil moisture measurement that meets or exceeds a preset threshold and/or at the expiration of a preset time interval. The device utilizes a control system comprised of a microcontroller and an embedded application or applications to initiate moisture sensor readings and the opening and closing of the magnetically sealed valve. The valve is opened when the control system actuates a small motor that engages a Hall Effect sensor system with an articulated member having a reference magnet used as an open-closed valve status indicator and a strong magnet that is moved into a position to unseat a magnetically seated valve stop.

DETAILED DESCRIPTION

Figures 1, 2:
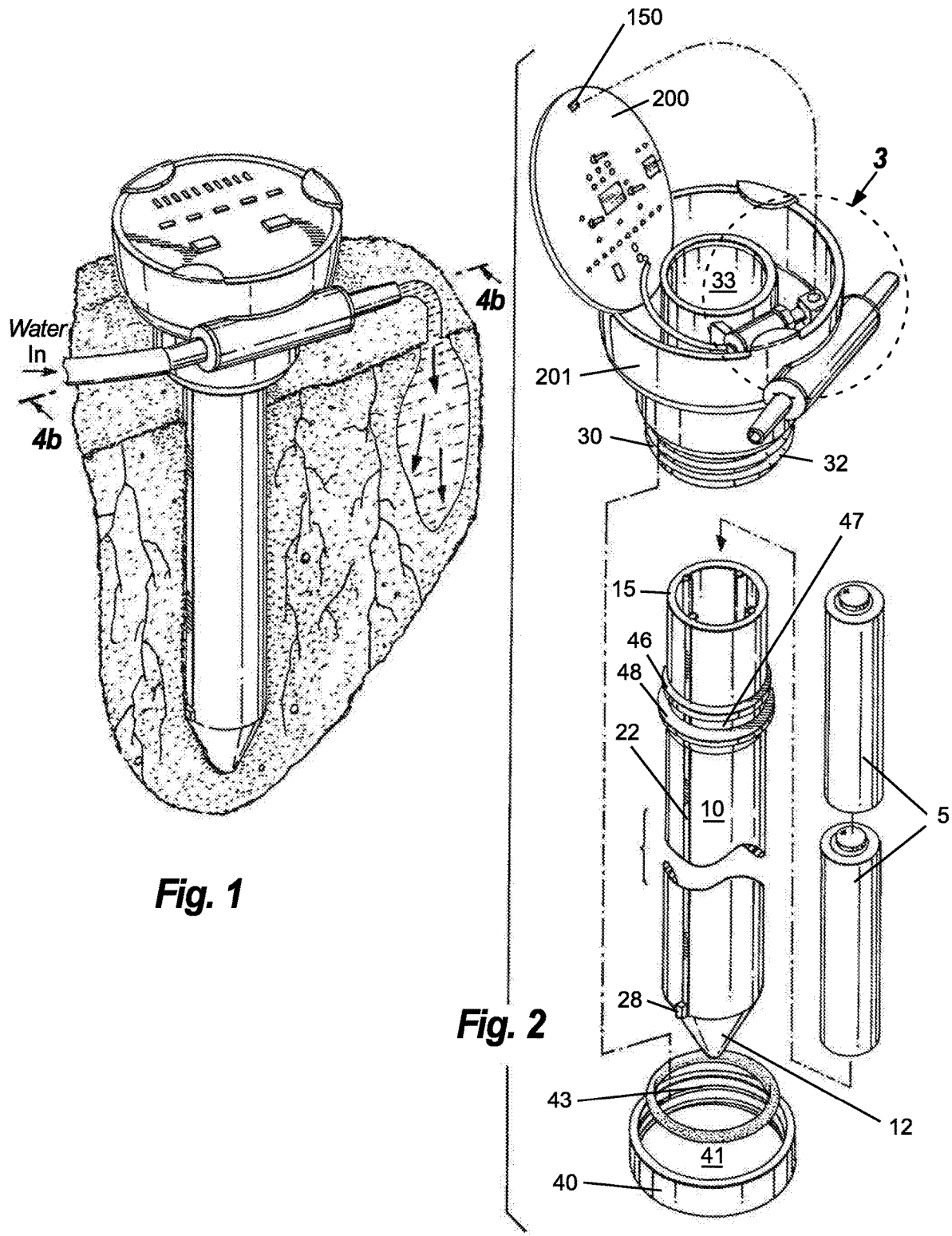
FIG. 1 depicts a side view of the watering device.
FIG. 2 depicts an exploded perspective view of the valve control and assembly.

The apparatus of the present application, as depicted in FIG. 1 and described herein, is an active autonomous watering device 300 having an integrated means to measure soil moisture 20 affixed to a support member 10, a user interface 250, and a water valve 80.

Figure 3:
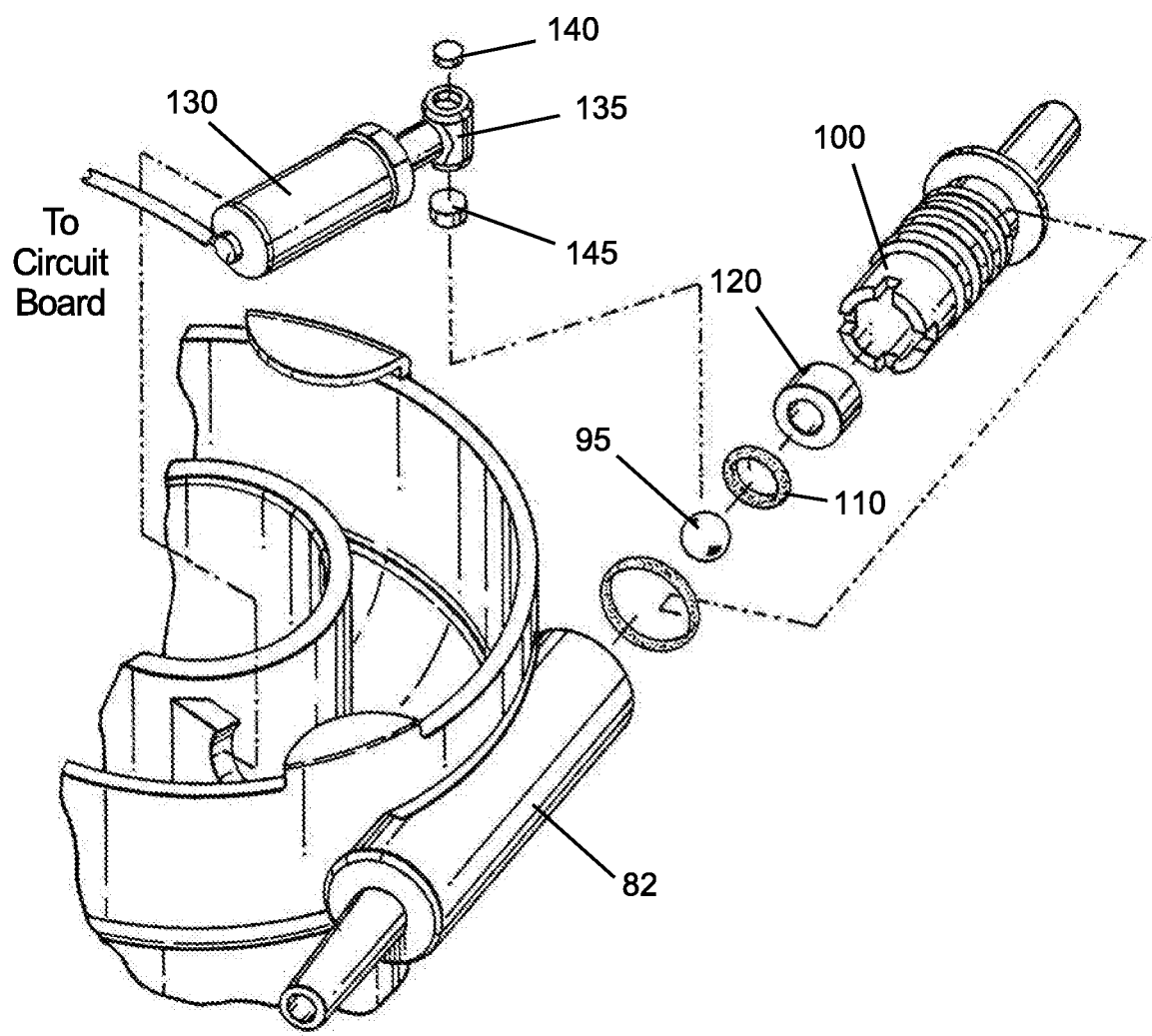
FIG. 3 depicts an exploded view of the device.

As depicted in FIGS. 2-3 and described herein, the means to measure soil moisture is preferably a resistive soil moisture sensor having a plurality of probes, but having at least a first probe 22 and a second probe 24 separated by soil. An electric current generated by the device's battery 35 is passed through one of the probes and measured at the other probe by the control system 200, with the difference in current between the probes being a measure of the soil resistivity. Soil resistivity is known to be affected by moisture content, temperature, and soil composition. When soil temperature and composition are relatively constant, a change in soil moisture content is the predominant factor in changes to soil resistivity. The soil resistivity is measured by the control system 200, and that data is used by the microprocessor 31 and its program to calculate the soil moisture. To prevent the effects of electrolysis in the probes 22, 24, the probes are only activated for about 500 milliseconds by the control system 200 when soil moisture is to be measured.

In an alternative embodiment, a similar means to measure soil moisture is a capacitive sensor system 20 used to quantify soil moisture based on the dielectric constant of the soil. The dielectric constant of the soil increases as the water content of the soil increases. This response is due to the fact that the dielectric constant of water is much larger than the other soil components, including air. Thus, measurement of the dielectric constant gives a predictable estimation of soil moisture. Alternatively, the dielectric permittivity of soil is determined by measuring the charge time of a capacitor made with that soil. On either method to measure soil moisture, resistive or capacitive, the control system 200 activates the soil moisture probes for only 500 milliseconds to measure soil moisture to reduce electricity consumption. The means to measure the soil moisture 20 utilizes at least one pair of probes, e.g. a first probe 22 and a second probe 24, affixed to a soil implantable support member 10. Each of the probes 22, 24 are protected by probe shields 28 to deflect soil, rock, and roots from dislodging the probes.

As shown in FIGS. 2 and 4 and described herein, the autonomous watering device 300 integrates all mechanical, electrical and electronic components necessary to control soil moisture (e.g., water valve 80, user interface 250, control system 200 and batteries 5) into a single waterproof casing. The support member 10 is removably attached to an annular adapter 30 that has affixed the valve housing 75 on one side and the control system housing 201 on top. The support member 10 is preferably cylindrical and hollow and, in some embodiments, may be used to store the electrical batteries 5 that power the device 300. A first probe 22 and a second probe 24 extend down the outside length of the support member 10 to terminate near the support member base 12 for the purpose of inducing a current across the soil to permit the measurement of resistivity or, alternatively, capacitance by the control system 200. The distal end 26 of each of the probes 22, 24 are protected by probe shields 28 to deflect soil, rock, and roots from dislodging the probes 22, 24 from the support member outer wall 13. Ideally, the support member 10 is approximately 10 cm long with the support member base 12 shaped as an inverted cone to facilitate piercing of the ground and positioning of the soil moisture probes 22 and 24 into the ground.

The support member 10 can be introduced into an annular adapter 30 and secured with a adapter fitting 40. The support member 10 possesses a support member top 15 which can be inserted into an annular adapter 30 affixed to the base 77 of the control system housing 201. The adapter 30 is a hollow cylinder which possesses an annular adapter support member port 33 formed by the hollow void within the adapter inner wall 31. The adapter support member port 33 has a slightly larger internal diameter than the support member's 10 external diameter so as to allow the fitted entry of the support member top 15 into the adapter support member port 33 of the adapter 30; this provides an exact fit between the support member outer wall 13 and the adapter inner wall 31. The outer wall of the support member 10 also possesses an adapter fitting stop 48 that sets the distance that the support member 10 can be inserted into the annular adapter 30. The outer diameter of the adapter fitting stop 48 is equal to the outer diameter of the annular adapter 30 and is located at a distance from the support member top 15 that is less than the length of the support member 10 than can be received into the adapter 30 through the adapter support member port 33.

The outer wall 34 of the annular adapter 30 possesses adapter fitting receiving threads 32 to receive an internally threaded adapter fitting 40. The adapter fitting 40 is preferably a ring-like cap with a L-shape wall. The inner wall 42 of the adapter fitting 40 possesses adapter receiving threads 43 which engage the adapter fitting receiving threads 32 of the adapter 30. The outer diameter of the adapter fitting stop 48 is smaller than the vertical wall of the adapter fitting 40 (i.e., vertical part of the L-shape profile wall) but larger than the horizontal wall of the adapter fitting 40 (i.e., horizontal part of the L-shape profile wall). When the support member 10 is inserted into the annular adapter 30, the adapter fitting 40 slides up the length of the support member 10 until the adapter fitting stop 48 where it engages the adapter threads 32 to secure the support member 10 to the annular adapter 30. In one embodiment, an adapter fitting o-ring 45 can be placed beneath the adapter 30 and atop the adapter fitting stop 48 into a seal receiving groove 47 bounded by seal stop 46 above the adapter fitting stop 48, which is compressed when the adapter fitting 40 is screwed onto the adapter 30, thus, creating a waterproof seal between the support member 10 and the adapter 30.

Figure 4A:
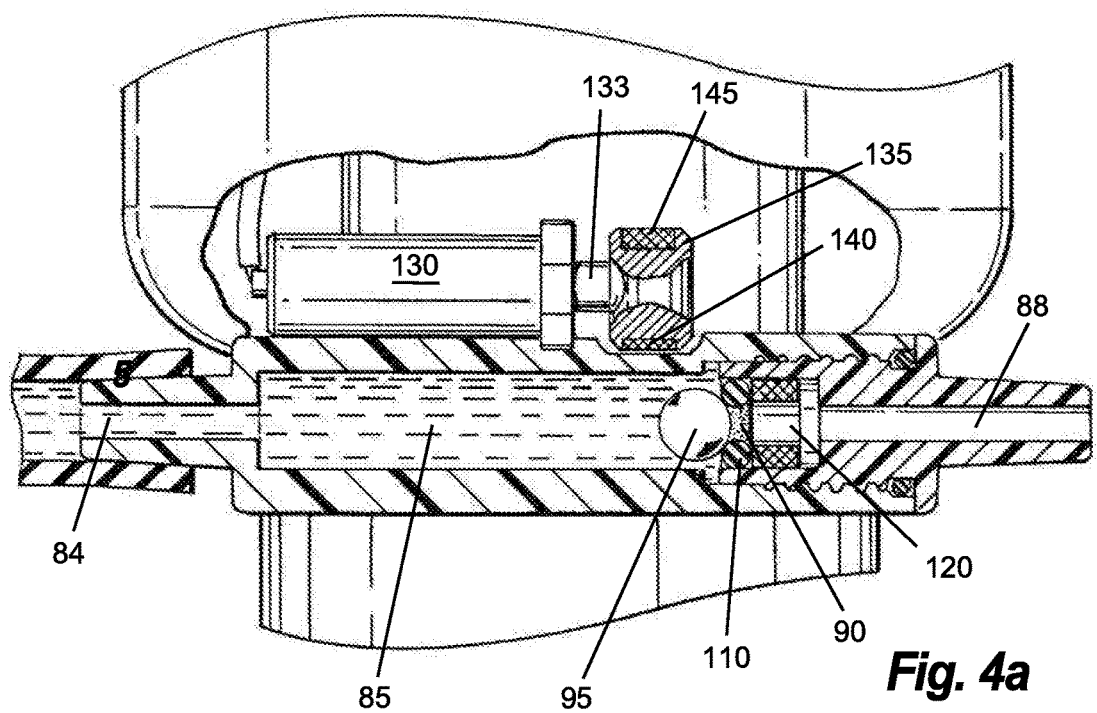
FIG. 4a depicts a cutaway view showing a closed valve.
Figure 4B:
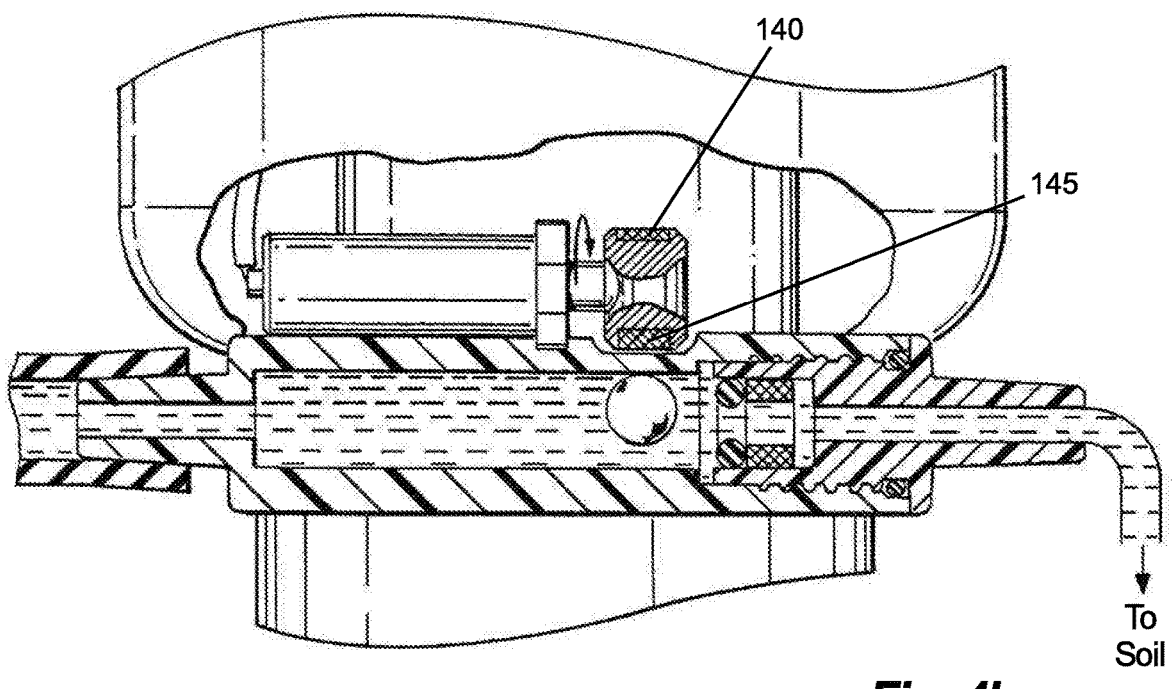
FIG. 4b depicts a cutaway view showing an open valve.

The watering device 300, as depicted in FIGS. 4a and 4b, utilizes a low-energy consumption magnetic valve 80 that is actuated by a small geared motor 130 that runs for half a second to open and close the valve by manipulating a magnetic valve stop 95. The valve body 82 possesses a valve body inlet 84, a valve body outlet 88, and a valve chamber 85 between the body inlet 84 and the body outlet 88. In an embodiment, a hollow, i.e. ring-like, seat magnet 120 resides on the inside of the valve chamber 85 adjacent to the valve body outlet 88 so as to attract a magnetic ball bearing 95 located inside the valve chamber 85. The hollow magnet 120 generates a sufficiently strong magnetic field upon the ball bearing 95 moving the ball bearing 95 from its seated position in the chamber to seat on the hollow magnet 120, thus blocking water flow through the chamber 85. In this configuration, the resting state of the magnetically sealed valve 80 is a closed state. In some embodiments, the device valve 80 includes an o-ring 110 located in the interior of the chamber 85 and resting on the face of the hollow seating magnet 120, which allows for a compressible and much tighter seal by the magnetic ball bearing 95.

The valve 80 utilizes a motor 130 that rotates a magnet support 135 preferably equipped with at least two magnets, i.e. a small reference magnet 140 at one end and a larger valve stop unseating magnet 145 at the other end. The magnet support 135 is located immediately outside the valve chamber 85 so as to be able to position an end of the magnet support 135 adjacent to the magnetic ball bearing 95. When the magnet support 135 has the larger unseating magnet 145 facing down, the magnetic force of the larger unseating magnet 145 upon the magnetic ball bearing 95 breaks the seal between the ball bearing 95 and the hollow seating magnet 120 located at the valve body outlet 88 allowing water to flow thought chamber 85 from the valve body inlet 84 to the valve body outlet 88. The small reference magnet 140 is of insufficient force to break the seal between the ball bearing 95 and the hollow seating magnet 120. When the magnet support 135 is rotated so that the small reference magnet 140 is facing down, the magnetic force of the small reference magnet 140 upon the magnetic ball bearing 95 is insufficient to breaks the seal between the ball bearing 95 and the hollow magnet 120 and thus the valve remains closed. Rotation of the magnet support 135, when the motor 130 is ON, changes the position of the unseating magnet 145 or small reference magnet 140 that is immediately above the magnetic ball bearing 95, and whether the valve is open or closed, respectively.

When the small reference magnet 140 is in position adjacent to the magnetic ball bearing 95, and the valve 80 is closed, the larger unseating magnet 145 is adjacent to a Hall Effect sensor 150 in communication with the control system 200. Likewise, when the larger unseating magnet 145 is adjacent to magnetic ball bearing 95, and the valve 80 is open, the small reference magnet 140 is adjacent to the Hall Effect sensor. When the small reference magnet 140 is sensed by the Hall Effect sensor 150, the control system 200 treats the signal as an indicator that the valve is open. When the larger unseating magnet 145 is sensed by the Hall Effect sensor 150, the control system 200 treats the signal as an indicator that the valve is closed.

The motor 130 ideally operates at 120 revolutions per minute, so turning the magnet support 135 180% to open and close the valve 80, takes only 500 milliseconds. Additionally, breaking the seal between ball bearing 95 and the hollow seating magnet 120 requires very little torque. The operation of the valve 80 consumes very little power, which extends the lifespan of the electrical batteries 5 and permits autonomous operation of the device 300 for up to two years using two AA batteries 5.

Figure 5:
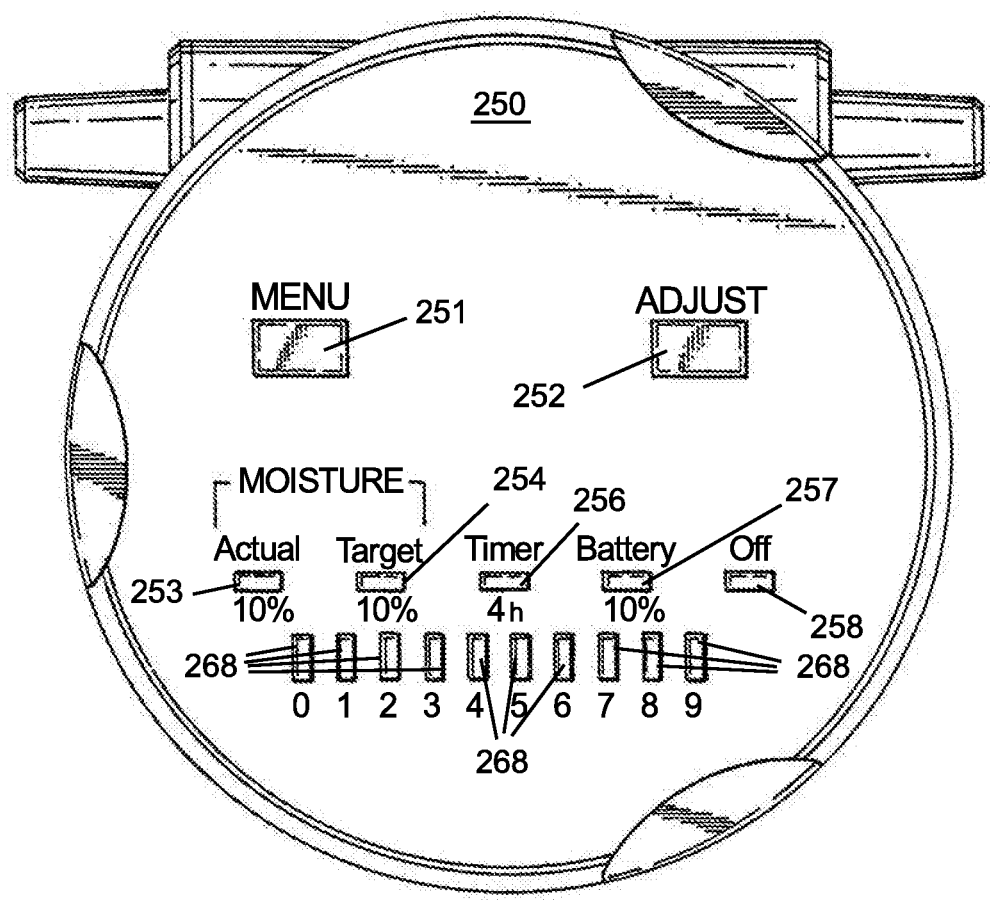
FIG. 5 depicts the user interface.

As shown and depicted in FIG. 5 and described herein, the control system 200 utilizes a simple user interface 250 as shown in FIG. 3, to set-up the watering cycles, e.g., setting the desired moisture for the soil and how often to water. The control system 200 uses an embedded microprocessor 210 that the user can program using the user interface 250. This user interface 250 avoids the use of external hardware and software to program the device and display data.

The user interface 250 allows the user to input data for some control variables, e.g. soil moisture target and setting a time interval for watering. A simple menu button 251 permits the user to cycle through controls and readings. When the user presses the menu button 251, it cycles through selectable program attributes indicating a control or reading as indicated by a set of program attribute LEDs 260. While within a selected program attribute, the adjust button 252 can be used to adjust settings for configurable attributes as indicated by a set of ten level identifying LEDs 268.

The user interface 250 is normally powered down to conserve power. Initially pressing the menu button 251 powers the user interface 250 and turns on the ACTUAL MOISTURE LED 253 in the attribute LED array 260 to display measured soil moisture and a level identifying LED 268 to indicate the measured value for the ACTUAL MOISTURE attribute.

Pressing the menu button 251 again turns off the LED for the ACTUAL SOIL MOISTURE attribute and cycles the user interface 250 to the TARGET SOIL MOISTURE attribute while turning on the TARGET SOIL MOISTURE LED 254 in the attribute LEDs 260 to indicate the selection of the TARGET SOIL MOISTURE attribute and a level identifying LED 268 to indicate the selected value for the TARGET SOIL MOISTURE.

Proceeding to press the menu button 251 again turns off the LED for the TARGET SOIL MOISTURE attribute and cycles the user interface 250 to the TIMER attribute while turning on the TIMER LED 256 in the attribute LEDs 260 to indicate the selection of the TIMER attribute and a level identifying LED 268 to indicate the selected value for the TIMER.

Proceeding to press the menu button 251 again turns off the LED for the TIMER attribute and cycles the user interface 250 to the BATTERY LEVEL attribute while turning on the BATTERY LEVEL LED 257 in the attribute LEDs 260 to indicate the selection of the BATTERY LEVEL attribute and a level identifying LED 268 to indicate the measured value for the BATTERY LEVEL. A BATTERY LEVEL LED 256 also acts as a low battery indicator, flashing when the battery 5 reaches critical levels. Once the low battery indicator is actuated, the device 300 has approximately eight weeks of remaining power. The device 300 can operate at voltages as low as 1.8 v.

Proceeding to press the menu button 251 again turns off the LED for the BATTERY LEVEL attribute and cycles the user interface 250 to the POWER attribute while turning on the POWER OFF LED 258 in the attribute LEDs 260 to indicate that the user has powered off the device. When the system is left in the OFF position, the control system 200 deactivates all functions and flashes the OFF LED indicating that the system is OFF. Pushing the Menu button again turns off the OFF LED and activates the device.

The present apparatus recognizes and addresses long-felt needs and provides utility in meeting those needs in its various possible embodiments. To one of skill in this art who has the benefits of this disclosure's teachings, other and further objects and advantages will be clear, as well as others inherent therein. The disclosures herein are not intended to limit the scope of the invention, merely to provide context with which to understand the patent claims.

What is claimed is:

1. An integrated soil moisture sensor and watering device comprising:
 (a) an electronic means to quantify soil moisture;
 (b) a passive magnetic valve having a valve body inlet, a valve body outlet, a valve stop seat between said valve body inlet and said valve body outlet, a valve chamber between said valve body inlet and said valve body outlet, a valve stop within said valve chamber that acts to seal said valve chamber from said valve body outlet when said valve stop is seated against said valve stop seat, a valve stop seating magnet fixed within said valve body that acts to seat said valve stop onto said valve stop seat to prevent the flow of fluid through the valve body;
 (c) a magnet support possessing a valve stop unseating magnet opposed against a relatively weaker reference magnet, wherein a motor driven shaft is affixed to said magnet support at a point between said valve stop unseating magnet and said reference magnet so as to cause said magnet support to rotate said valve stop unseating magnet and said reference magnet into positions either adjacent to said valve stop or adjacent to a magnetic sensor whereby said valve is caused to open due to the magnetic field of said valve stop unseating magnet acting to open said valve by unseating said valve stop when said valve stop unseating magnet is positioned by said magnet support in close proximity to said valve stop and said valve is caused to close when said reference magnet is rotated into a position in close proximity to said valve stop;
 (d) a low power micro-geared motor to rotate said motor driven shaft so as to position said valve stop seating magnet in close proximity to either said magnetic sensor or said valve stop through a 180° rotation of said motor driven shaft, said micro-geared motor only requiring intermittent power so as to cause said motor driven shaft to rotate 180° so as to open and close said valve on demand and consuming only so much power as is needed to rotate said magnet support 180° to operate said valve thereby permitting long term autonomous operation powered by a power source providing as little as 3 volts;

(e) a control system in communication with said soil moisture sensing means and said valve, wherein said control system is programmed to actuate said motor to drive said motor driven magnet support and open and close said valve in response to soil moisture measurements, the passage of time, or both.

2. The device of claim 1, wherein a seal is utilized between said valve stop and said valve stop seat.

3. The device of claim 1, wherein said magnetic sensor is a Hall Effect sensor.

4. The device of claim 1, further comprising a user interface, wherein a menu push button cycles through programmable attributes, an adjust push button allows setting up values for said specific attributes and LEDs allow for said visualization of programmable attributes and their values.

5. The device of claim 4, wherein said control system utilizes a microprocessor having an embedded microprocessor control program.

6. The control system of claim 5, wherein said device is programmed to open said valve when a target soil moisture content is sensed.

7. The control system of claim 6, wherein said device is programmed to close said valve when a target soil moisture content is sensed.

8. The device of claim 7, wherein soil moisture is quantified by measuring an electrical property between a first electrode and a second electrode embedded in and separated by soil.

9. The device of claim 8, wherein said electrical property is resistivity.

10. The device of claim 8, wherein said electrical property is capacitance.

11. The device of claim 8, wherein the device is programmed to close said valve when a threshold resistance to the flow of an electrical current between said first and said second electrodes is exceeded.

12. The device of claim 1, wherein said device is battery powered.

13. The device of claim 1, wherein said device is solar powered.

* * * * *